(12) United States Patent
Galimberti et al.

(10) Patent No.: US 7,166,665 B2
(45) Date of Patent: Jan. 23, 2007

(54) ELASTOMERIC COMPOSITION AND TIRE COMPRISING THE COMPOSITION

(75) Inventors: Maurizio Galimberti, Milan (IT); Luigi Fino, Bovisio Masciago (IT); Claudio Zanichelli, Nebbiuno (IT); Enrico Albizzati, Lesa (IT)

(73) Assignee: Pirelli Pneumatici S.p.A., Milan (IT)

( * ) Notice: Subject to any disclaimer, the term of this patent is extended or adjusted under 35 U.S.C. 154(b) by 278 days.

(21) Appl. No.: 10/169,408

(22) PCT Filed: Dec. 14, 2000

(86) PCT No.: PCT/EP00/12856

§ 371 (c)(1), (2), (4) Date: Oct. 25, 2002

(87) PCT Pub. No.: WO01/49785

PCT Pub. Date: Jul. 12, 2001

(65) Prior Publication Data

US 2003/0109625 A1    Jun. 12, 2003

Related U.S. Application Data

(60) Provisional application No. 60/175,682, filed on Jan. 12, 2000.

(30) Foreign Application Priority Data

Dec. 30, 1999    (EP) .................................. 99830821

(51) Int. Cl.
C08K 3/04 (2006.01)
C08K 3/36 (2006.01)
B60C 1/00 (2006.01)

(52) U.S. Cl. ...................... 524/492; 524/493; 524/495; 524/496; 152/151; 152/565

(58) Field of Classification Search ................ 524/492, 524/493, 495, 496; 152/565
See application file for complete search history.

(56) References Cited

U.S. PATENT DOCUMENTS

| 3,856,723 A | 12/1974 | Vrisakis et al. |
| 4,002,796 A | 1/1977 | Baldi et al. |
| 4,550,142 A | 10/1985 | Akita et al. |
| 4,742,124 A | 5/1988 | Tsutsumi et al. |
| 5,374,671 A | 12/1994 | Corvasce et al. |
| 5,545,680 A | 8/1996 | Corvasce et al. |
| 5,672,639 A * | 9/1997 | Corvasce et al. ............ 524/52 |
| 6,209,603 B1 * | 4/2001 | Kanenari et al. ........... 152/458 |
| 6,269,858 B1 * | 8/2001 | Sandstrom ................... 152/547 |
| 6,376,587 B1 * | 4/2002 | Ajiro et al. .................. 524/252 |

FOREIGN PATENT DOCUMENTS

| EP | 0 451 604 | 10/1991 |
| EP | 0 483 736 A2 * | 5/1992 |
| EP | 0 501 227 | 9/1992 |
| EP | 0 795 581 | 9/1997 |
| EP | 0 896 981 | 2/1999 |
| GB | 992016 | 5/1965 |

OTHER PUBLICATIONS

Shingo et al.; "Pneumatic Tire"; Patent Abstracts of Japan, of JP5-170976 A, (Jul. 1993).

* cited by examiner

*Primary Examiner*—Tae H. Yoon
(74) *Attorney, Agent, or Firm*—Finnegan, Henderson, Farabow, Garrett & Dunner, L.L.P.

(57) ABSTRACT

An elastomeric composition includes at least one elastomeric diene polymer, at least one thermoplastic polymer, and at least one polymer comprising functional groups. The at least one thermoplastic polymer comprises a main hydrocarbon chain. Hydrophilic groups are linked to the main hydrocarbon chain. The functional groups are reactive with the hydrophilic groups. The composition may also include at least one reinforcing filler. The at least one reinforcing filler may include carbon black, silica, or both carbon black and silica. The composition may further include a silica coupling agent, a sulfur-based vulcanizing agent, or both a silica coupling agent and a sulfur-based vulcanizing agent. A tire for vehicle wheels including at least one element including an elastomeric material, where the at least one element include the composition, is also disclosed.

35 Claims, 1 Drawing Sheet

ELASTOMERIC COMPOSITION AND TIRE COMPRISING THE COMPOSITION

CROSS-REFERENCE TO RELATED APPLICATIONS

This application is a national stage entry under 35 U.S.C. § 371 from International Application No. PCT/EPOO/12856, filed Dec. 14, 2000, in the European Patent Office, the contents of which are relied upon and incorporated herein by reference; additionally, Applicants claim the right of priority under 35 U.S.C. § 119(a)–(d) based on patent application No. 99830821.7, filed Dec. 30, 1999, in the European Patent Office; further, Applicants claim the benefit under 35 U.S.C. § 119(e) based on prior-filed, copending provisional application No. 60/175,682, filed Jan. 12, 2000, in the U.S. Patent and Trademark Office.

BACKGROUND OF THE INVENTION

1. Field of the Invention

DESCRIPTION

The present invention relates to a tire for vehicle wheels and to an elastomeric composition. More particularly, the present invention relates to a tire for vehicle wheels comprising at least one element made of a cross-linked elastomeric material including a hydrophilic polymer, and to an elastomeric composition comprising a hydrophilic polymer.

2. Description of the Related Art

In the rubber industry, in particular in the manufacture of tires for vehicle wheels, the use is known of elastomeric compositions wherein reinforcing fillers have been incorporated in the polymer base, in order to improve the characteristics of the cross-linked product, in particular mechanical properties and abrasion resistance. Thanks to its high reinforcing efficiency, carbon black is the most widely employed reinforcing filler. However, carbon black imparts to the cross-linked product marked hysteretic characteristics, i.e. an increase of heat dissipated in dynamic conditions, which, as is known, causes, in the case of a tire, an increase in the rolling resistance of the tire itself. This leads to an increase of the fuel consumption of the vehicles, and hence of both locomotion costs and air pollution. It is possible to try to reduce such adverse effects by employing smaller amounts of carbon black and/or a carbon black having a smaller surface area. This inevitably leads to a reduction of the reinforcing action, with a worsening of the mechanical properties and of the abrasion resistance of the final product.

In order to reduce the hysteretic characteristics of the cross-linked products it is known to use the so-called "white" reinforcing fillers, such as gypsum, talc, kaolin, bentonite, titanium dioxide, silicates of various types and especially silica, which replaces carbon black either entirely or partly. In this regard, see for example European patent EP-501,227.

The use of silica-based reinforcing fillers involves several drawbacks, substantially related to the poor affinity of the same with respect to the elastomers commonly used in the tire manufacture. In particular, to obtain a good dispersion degree of silica within the polymer matrix it is necessary to submit the elastomeric compositions to an extensive thermal-mechanical mixing action. To increase the affinity between silica and the elastomeric matrix, it is necessary to employ suitable coupling agents, for instance sulfur-containing organosilane products. However, the need of using such coupling agents sets a limit to the maximum temperature that can be reached during mixing and thermal-mechanical processing operations, on pain of an irreversible thermal degradation of the coupling agent.

Therefore, it is still strongly felt the need of introducing in the rubber compositions for tires new fillers which impart to the end product performances at least comparable to those obtained with conventional fillers, but without showing the drawbacks mentioned hereinabove. Said fillers should also be able to modulate the performances of the finished product as a function of use conditions.

In the prior art, it was for instance suggested to introduce hydrophilic polymers in elastomeric compositions, particularly in the rubber compositions used for the manufacture of tire treads, in order to increase the road grip of the tire, in particular on wet or iced grounds.

For instance, in Japanese patent application (Kokai) JP-H5-170976 a tire is described which has an improved road grip on ice or snow grounds, wherein the tread includes short fibers and from 1 to 15 phr of powdered polyvinylalcohol (phr=parts by weight per 100 parts by weight of rubber). The fibers, for instance cellulose or synthetic polymer fibers, are oriented along the circumferential direction of the tire, so as to impart anisotropic characteristics. Road grip on ice or snow surfaces is improved by the presence of polyvinylalcohol particles which, when contacted with water, dissolve, leaving in the tread cavities which increase roughness and hence road grip of the tread. The amount of polyvinyl alcohol powder should not exceed 15 phr, so as not to worsen wear resistance to an unacceptable extent. Besides, low amounts of polyvinylalcohol are necessary not to increase tread stiffness and therefore not to worsen the road grip on dry grounds.

In European patent application EP-896,981, an elastomeric composition for use in tire tread manufacture is described, which includes modified polyvinylalcohol, in the form of powder or fibers. Such modified polyvinylalcohol has polyoxyalkylene groups along the chain, which increase the water solubility of the polymer, hence promoting dissolution of the same when the tread gets in touch with a wet surface, leaving cavities in the tread itself and forming a sticky layer at the interface with the road surface which should increase the tire road grip.

The use of hydrophilic polymers deriving from starch in elastomeric compositions is described in U.S. Pat. Nos. 5,374,671 and 5,545,680. In particular, such patents describe elastomeric compositions comprising from 1 to 50 phr of a hydrophilic polymer having a glass transition temperature ($T_g$) ranging from 150° C. to 0° C. depending upon the absorbed amount of water. Such hydrophilic polymer is a destructured starch comprising amylose, amylopectine, or mixtures thereof. The presence of the destructured starch in a rubber composition for tire treads is said to increase traction on wet grounds, while reducing at the same time rolling resistance on dry roads. The destructured starch may be homogeneously dispersed throughout the elastomeric matrix or, preferably, it is immiscible with the polymeric matrix so that it tends to form fibers, preferably oriented fibers, within said matrix. Since destructured starch is a hydrolyzable and biodegradable polymer, its presence in a tire is said to increase its biodegradability. A grafting agent may be added to the rubber composition, in order to bind the hydrophilic polymer to the elastomeric base. No indications are given either about the grafting agent to be used, or on how to accomplish such grafting.

U.S. Pat. No. 5,672,639 describes an elastomeric composition reinforced with a destructured starch combined with a plasticizer compatible with the destructured starch, so as to form a starch/plasticizer composite. With respect to destructured starch as such, said composite is said to have a better miscibility in the elastomeric matrix and would therefore prevent the formation of agglomerates of non dispersed starch. The plasticizer has a softening point lower than the softening point of destructured starch. In particular, poly (ethylene-vinylalcohol) having a softening point lower than 160° C., preferably comprised between 90° and 130° C., may be employed as a plasticizer. Other products which may be used as plasticizers include: ethylene/vinylacetate copolymers, ethylene/glycidylacrylate copolymers and ethylene/maleic anhydride copolymers, cellulose acetate, diesters of dibasic organic acids, and the like. To try to couple the starch/plasticizer composite with the elastomeric matrix, the addition of a coupling agent having a group which reacts with the hydroxyl groups of the composite, and a group capable of interacting with the elastomeric matrix is suggested. To this aim, the use of coupling agents normally employed in silica-containing rubber compositions, in particular an organosilane tetrasulfide, is indicated.

SUMMARY OF THE INVENTION

In the Applicant's perception, the elastomeric compositions including a hydrophilic polymer should satisfy various requirements to render their use actually advantageous in the manufacture of cross-linked products, and in particular tires. First of all, such compositions, once cross-linked, should be able to absorb significant amounts of water, so as to change the performance of the product when the latter gets in touch with water. On the other hand, the presence of the hydrophilic polymer should not jeopardize the basic characteristics of the elastomeric cross-linked composition, e.g. tensile properties (in particular, tensile stress at break, elongation at break and modulus), dynamic properties (in particular, dynamic modulus and tandelta), and abrasion resistance.

The Applicant has now found that it is possible to address the above requirements by introducing in the elastomeric matrix a thermoplastic polymer containing hydrophilic groups as defined hereinafter, combined with a polymer having groups reactive with said hydrophilic groups. In this way, it is possible to produce an article wherein the hydrophilic polymer is capable of absorbing significant amounts of water without dissolving and, therefore, being easily removed from the elastomeric matrix. Besides, the hydrophilic polymer is able to exert a reinforcing action on the elastomeric material, thus replacing, at least partially, the conventional reinforcing fillers, while keeping excellent, both tensile and dynamic, mechanical properties.

In a first aspect, the present invention therefore relates to a tire for vehicle wheels comprising at least one element made of an elastomeric material, characterized in that said element includes a composition comprising:

(a) at least one elastomeric diene polymer;

(b) at least one thermoplastic polymer having a main hydrocarbon chain to which hydrophilic groups are linked;

(c) at least one polymer containing functional groups reactive with said hydrophilic groups.

In a preferred aspect, said element including said composition is a tread belt.

In another aspect, the present invention relates to an elastomeric composition comprising:

(a) at least one elastomeric diene polymer;

(b) at least one thermoplastic polymer having a main hydrocarbon chain to which hydrophilic groups are linked;

(c) at least one polymer containing functional groups reactive with said hydrophilic groups.

In the present description and claims, by the expression "thermoplastic polymer having a main hydrocarbon chain to which hydrophilic groups are linked" (for the sake of brevity also "hydrophilic polymer") it is meant a synthetic polymer wherein hydrophilic groups, either directly or through side groups, are linked to the main hydrocarbon chain, either linear or branched, and free from glycoside bonds. As known, glycoside bonds are ether bonds, cleavable by hydrolysis, deriving from polycondensation of monosaccharides, which are typically present in polysaccharides such as starch and cellulose.

In the present description and claims, by "hydrophilic groups" it is meant groups which are able to bind water molecules by means of hydrogen bonds.

According to a preferred embodiment, the hydrophilic polymer is present in the elastomeric composition in a quantity comprised between 0.1 and 100 phr, preferably between 3 and 50 phr, even more preferably between 5 and 20 phr. As is known, "phr" means parts by weight per 100 parts by weight of elastomeric base.

Preferably, the polymer containing functional groups reactive with the hydrophilic groups (in the following also referred to, for the sake of brevity, "functionalized polymer") is present in the elastomeric composition in a quantity so as to obtain a weight ratio between the hydrophilic polymer and the functionalized polymer comprised between 0.5:1 and 10:1, preferably between 1:1 and 5:1.

According to a preferred embodiment, said hydrophilic groups are selected from:

hydroxyl groups —OH;

carboxylic groups —COOH, possibly at least partially in the salt form;

ester groups —COOR (R=alkyl or hydroxyalkyl);

amide groups —$CONH_2$;

sulfonic groups —$SO_3H$, possibly at least partially in the salt form.

Preferably, the hydrophilic polymers according to the present invention are capable to absorb at least 0.1% by weight of water based on the polymer weight, after a 24-hour exposure in an environment having a 50% relative humidity at the temperature of 24° C. (according to standard method ASTM D570).

Preferably, the hydrophilic polymers according to the present invention are thermoplastic products having a melting temperature lower that 230° C., preferably comprised between 200° and 130° C.

The hydrophilic polymers according to the present invention may be selected in particular from: polyacrylic acid, polymethacrylic acid, polyhydroxyalkylacrylate, polyalkylacrylate, polyacrylamide, acrylamide/acrylic acid copolymers, polyvinylalcohol, polyvinylacetate, vinylalcohol/vinylacetate copolymers, ethylene/vinylacetate copolymers, ethylene/vinylalcohol copolymers, ethylene/vinylalcohol/vinylacetate terpolymers, polyvinyl-sulfonic acid, polystyrene sulfonate, and mixtures thereof.

According to a particularly preferred embodiment, said hydrophilic polymer comprises repeating units having the formula

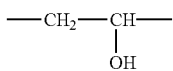

with a random or block distribution along the chain.

This preferred class of hydrophilic polymers encompasses: polyvinylalcohol, ethylene/vinylalcohol copolymers, ethylene/vinylalcohol/vinylacetate terpolymers. Polymers may also be used wherein the groups of formula (I) have been at least partially modified, for instance by partial acetylation with aliphatic aldehydes (as described, for instance, in U.S. Pat. No. 4,002,796).

The following are particularly preferred:

(i) vinylalcohol polymers obtained by hydrolysis of polyvinylacetate, with a hydrolysis degree comprised between 50 and 100 mol %, preferably between 70 and 90 mol %;

(ii) ethylene/vinylalcohol copolymers having a content of ethylene units generally comprised between 20 and 60 mol %, preferably between 25 and 50 mol %.

Copolymers of type (i) are commercially available under the trademarks Mowiol® (Clariant), Gohsenol® (Nippon Gohsei), Elvanol® (Du Pont), Airvol® (Air Products). Copolymers of type (ii) are commercially available under the trademark Soarnol® (Atochem).

The polymer containing functional groups reactive with the hydrophilic groups employable in the present invention is generally a thermoplastic hydrocarbon polymer in which functional groups have been introduced selected from: carboxylic groups, anhydride groups, ester groups, silane groups, epoxy groups. The amount of functional groups present in the polymer is generally comprised between 0.05 and 50 parts by weight, preferably between 0.1 and 10 parts by weight, based on 100 parts by weight of the polymer.

The functional groups may be introduced during the production of the polymer, by co-polymerization with corresponding functionalized monomers containing at least one ethylene unsaturation, or by subsequent modification of the hydrocarbon polymer by grafting said functionalized monomers in the presence of a free radical initiator (in particular, an organic peroxide).

Alternatively, it is possible to introduce the functional groups by reacting pre-existing groups of the hydrocarbon polymer with a suitable reagent, for instance by an epoxydation reaction of a diene polymer containing double bonds along the main chain and/or as side groups with a peracid (for instance, m-chloroperbenzoic acid or peracetic acid) or with hydrogen peroxide in the presence of a carboxylic acid or a derivative thereof.

In particular, the base hydrocarbon polymer may be selected from:

(a) ethylene homopolymers or copolymers of ethylene with an alpha-olefin having from 3 to 12 carbon atoms (preferably propylene or 1-octene), comprising in general from 35 to 97 mol % of ethylene and from 3 to 65 mol % of alpha-olefin, (b) propylene homopolymers or copolymers of propylene with ethylene and/or an alpha-olefin having from 4 to 12 carbon atoms (preferably 1-butene), the total amount of ethylene and/or alpha-olefin being less than 10 mol %;

(c) polymers of conjugated diene monomers having from 4 to 12 carbon atoms (preferably 1,3-butadiene, isoprene or mixtures thereof), possibly copolymerized with a monovinylarene having from 8 to 20 carbon atoms (preferably styrene) in an amount not higher than 50% by weight;

(d) homopolymers of monovinylarenes (in particular styrene) or copolymers thereof with ethylene.

Functionalized monomers which may be used include for instance: silanes containing at least one ethylene unsaturation; epoxy compounds containing at least one ethylene unsaturation; monocarboxylic or, preferably, dicarboxylic acids containing at least one ethylene unsaturation, or derivatives thereof, in particular anhydrides or esters.

Examples of silanes containing at least one ethylene unsaturation are: gamma-methacryloxypropyltrimethoxy-silane, allyltrimethoxy-silane, allyltriethoxy-silane, allylmethyldimethoxy-silane, allylmethyldiethoxy-silane, vinyltris (2-methoxyethoxy)-silane, vinyltrimethoxy-silane, vinylmethyldimethoxy-silane, vinyltriethoxy-silane, and the like, or mixtures thereof.

Examples of epoxy compounds containing at least one ethylene unsaturation are: glycidyl acrylate, glycidyl methacrylate, itaconic acid monoglycidyl ester, maleic acid glycidylester, vinylglycidyl ether, allylglycidyl ether, and the like, or mixtures thereof.

Examples of monocarboxylic or dicarboxylic acids containing at least one ethylene unsaturation are: maleic acid, maleic anhydride, fumaric acid, citraconic acid, itaconic acid, acrylic acid, methacrylic acid, and the like, and anhydrides or esters derived therefrom, or mixtures thereof. Maleic anhydride is particularly preferred.

Polyolefins grafted with maleic anhydride are available as commercial products identified for instance by the trademarks Fusabond® (Du Pont), Orevac® (Elf Atochem), Exxelor® (Exxon Chemical), Yparex® (DSM).

The elastomeric diene polymers usable as polymeric base in the present invention may be selected from those commonly used in sulfur-vulcanizable elastomeric compositions, particularly suitable for tire manufacture, i.e. among unsaturated chain elastomeric polymers or copolymers having a glass transition temperature generally lower than 20° C., preferably comprised between 0° and −90° C. Such polymers or copolymers may be of natural origin or may be obtained by solution or emulsion polymerization of one or more conjugated diolefins, possibly mixed with one or more monovinylarenes in an amount generally not higher than 50% by weight.

Generally, the conjugated diolefins have from 4 to 12, preferably from 4 to 8, carbon atoms, and may be selected from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene, and the like, or mixtures thereof. 1,3-butadiene and isoprene are particularly preferred.

Monovinylarenes possibly usable as comonomers generally have from 8 to 20, preferably from 8 to 12 carbon atoms, and may be selected for instance from: 1-vinylnaphthalene; 2-vinylnaphthalene; various alkyl, cycloalkyl, aryl, alkylaryl or arylalkyl styrene derivatives, such as for instance: alpha-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and the like, or mixtures thereof. Styrene is particularly preferred.

Preferably, the elastomeric diene polymers usable as a polymeric base in the present invention may be selected from: cis-1,4-polyisoprene (either natural or synthetic, preferably natural rubber), 3,4-polyisoprene, poly-1,3-butadiene (in particular, high vinyl 1,3-polybutadiene having a content of 1,2-polymerized units comprised between 15 and 85% by weight), polychloroprene, possibly halogenated isoprene/ isobutene copolymers, 1,3-butadiene/acrylonitrile copolymers, styrene/1,3-butadiene copolymers, 1,3-butadiene/isoprene copolymers, styrene/isoprene/1,3-butadiene copolymers, butadiene/acrylonitrile copolymers, and the like, or mixtures thereof.

Diene polymers functionalized by reaction with suitable terminating or coupling agents may also be employed. In particular, diene polymers obtained by anionic polymerization in the presence of an organometal initiator (in particular, an organo-lithium initiator) may be functionalized by reaction of the organometallic residues deriving from the initiator with suitable terminating or coupling agents such as imines, carbodiimides, alkyltin halides, substituted benzophenones, alkoxy- or aryloxy silanes (see, for instance, European patent EP-451,604 and U.S. Pat. Nos. 4,742,124 and 4,550,142).

At least one reinforcing filler may be advantageously added to the compositions according to the present invention, in an amount preferably comprised between 0.1 and 120 phr, preferably between 20 and 90 phr (phr=parts by weight per 100 parts of polymer base). The reinforcing filler may be selected from those commonly employed for cross-linked products, and in particular for tires, such as: carbon black, silica, alumina, aluminum silicates, calcium carbonate, kaolin and the like, or mixtures thereof. Carbon black, silica, or mixtures thereof are particularly preferred.

The carbon black grades usable according to the present invention may be selected from those conventionally used in tire manufacture, generally having a surface area not smaller than 20 m²/g (determined by CTAB absorption as described in ISO standard 6810).

The silica usable according to the present invention may generally be pyrogenic silica or, preferably, precipitated silica having a BET surface area comprised between 50 and 500 m²/g, preferably between 70 and 200 m²/g (measured according to ISO standard 5794/1).

If a reinforced filler comprising silica is present, the composition may advantageously incorporate a coupling agent capable of interacting with silica and to bind the latter to the polymer base during vulcanization.

Coupling agents of preferred use are those based on silane, identifiable for instance by the following structural formula:

$$(R)_3Si-C_nH_{2n}-X \qquad (II)$$

wherein:

groups R, equal or different from each other, are selected from: alkyl, alkoxy, aryloxy groups or halogen atoms, with the proviso that at least one of the R groups is an alkoxy or aryloxy group;

n is an integer of from 1 to 6;

X is a group selected from: nitrous, mercapto, amino, epoxy, vinyl, imido, chloro, $-(S)_m-C_nH_{2n}-Si(R)_3$, wherein m and n are integers of from 1 to 6, and the R groups are as defined above.

Among them, the silane-based coupling agent bis(3-trietoxysilylpropyl)tetrasulfide (Si69) is particularly preferred, either as such or suitably mixed with a small amount of inert filler (for instance, carbon black) to facilitate the incorporation of the same in the rubber composition.

The compositions according to the present invention may be vulcanized according to known techniques, and in particular with sulfur-based vulcanizing systems commonly employed for diene elastomers. To this end, after a first thermal-mechanical working steps, a sulfur-based vulcanizing agent is incorporated in the composition together with vulcanization activators and accelerators. In this second working step, the temperature is generally kept below 120° C., preferably below 100° C., to prevent undesired pre-cross-linking phenomena.

The vulcanizing agent of most advantageous use is sulfur or sulfur-containing molecules (sulfur donors) with accelerators and activators known to anyone skilled in the art.

Particularly effective activating agents are zinc compounds and in particular ZnO, ZnCO₃, zinc salts of fatty acids, saturated or unsaturated, having from 8 to 18 carbon atoms, such as for instance zinc stearate, preferably formed in situ in the rubber composition starting from ZnO and fatty acid, as well as BiO, PbO, Pb₃O₄, PbO₂, and mixtures thereof.

Accelerators of common use may be selected from: dithiocarbamates, guanidines, thioureas, thiazoles, sulphenamides, tiourams, amines, xanthates, and the like, or mixtures thereof.

The compositions according to the present invention may include other additives of common use selected on the basis of each specific application they are intended for. For instance, the following may be added to said compositions: antioxidants, antiageing agents, plasticizers, adhesive agents, antiozonants, modifying resins, fibers (for instance, Kevlar® pulp), and the like.

In particular, in order to further improve processability, a lubricant, generally selected from mineral oils, vegetable oils, synthetic oils and the like, or mixtures thereof, for instance: aromatic oil, naphthene oil, phthalates, soybean oil, and the like, may be added to the cross-linking compositions of the present invention. The amount of the lubricant may generally range between 2 and 100 phr, preferably between 5 and 50 phr.

The preparation of the compositions according to the present invention may be carried out by mixing the polymer components with the possibly present reinforcing filler and the other additives according to techniques known in the art. Mixing may be carried out for instance by means of an open-mill type mixer, or by means of an internal mixer of the type with tangential (Banbury) or interpenetrating (Intermix) rotors, or in continuous mixers of the Ko-Kneader (Buss) type, or of twin-screw co-rotating or counter-rotating type.

The hydrophilic polymer and the functionalized polymer may be used in the form of powder, beads or pellets. In order to improve mixing with the other components, such polymers may be used combined with a plasticizer, such as glycerin, pentaerythrite, and the like. Preferably, the compositions according to the present invention are produced in two steps. In a first step, the mixture of the hydrophilic polymer and of the functionalized polymer is prepared, possibly with a portion of the elastomeric base, thereby forming a masterbatch. In a subsequent step, the masterbatch is mixed with the remaining portion of the elastomeric base and the other components, according to conventional methods. The first step of masterbatch preparation is preferably carried out in a continuous mixer, for instance a twin-screw extruder, at a temperature of more than 120° C., so as to obtain an excellent dispersion of the thermoplastic polymers in the elastomeric base. The continuous mixers of preferred use are characterized by an adjustable geometry of the screw and thermal profile of the cylinder.

BRIEF DESCRIPTION OF THE DRAWING

Now, the present invention will be further illustrated by some examples, with reference to:

the attached FIG. 1, which shows a partly interrupted view in cross-section of a tire according to the invention.

DETAILED DESCRIPTION OF THE PREFERRED EMBODIMENTS

Figure 1:
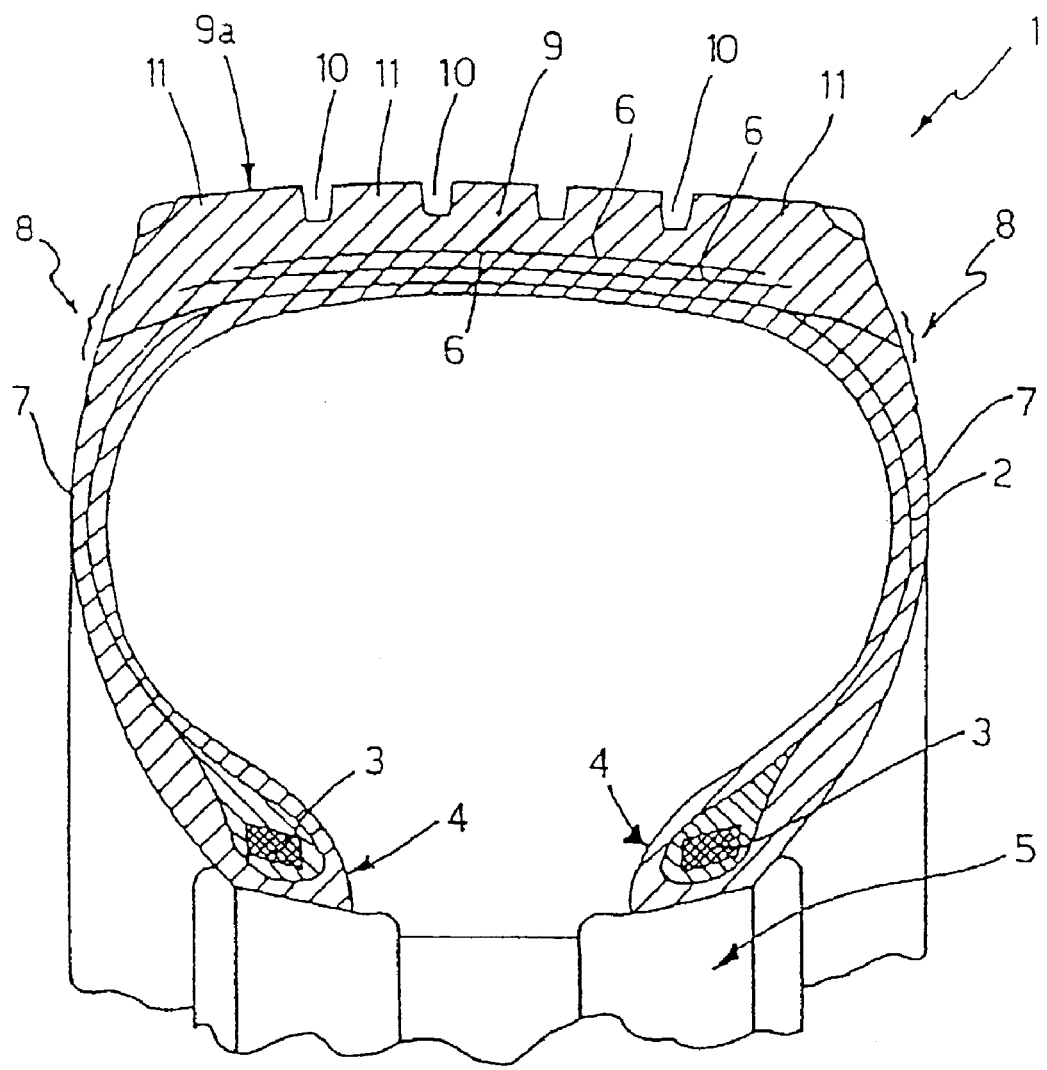

With reference to FIG. 1, a tire 1 conventionally comprises at least one carcass ply 2 whose opposite side edges are externally bent around respective bead wires 3, each incorporated in a bead 4 along a circumferential internal edge of the tire, at which said tire engages on a rim 5 which makes part of a vehicle wheel.

Along the circumferential development of the carcass ply 2 one or more belt strips 6, made of textile or metal chords incorporated in a sheet of rubber composition, are applied. Externally to the carcass ply 2, in respective opposite side portions of the same, a couple of sidewalls 7 is applied, each of which extends from the bead 4 up to a so-called "shoulder" zone 8 of the tire, defined at the opposite ends of the belt strip 6. A tread 9, whose side edges terminate at the shoulders 8, connecting with the side walls 7, is circumferentially applied on the belt strips 6. The tread 9 is externally provided with a rolling surface 9a, intended for getting in touch with the ground, wherein circumferential grooves 10 may be formed, intercalated with transversal slits, not shown in the attached FIGURE, which define a plurality of blocks 11, variously distributed on said rolling surface 9a.

The production process of the tire according to the present invention may be carried out with techniques and apparatuses known in the art. More particularly, such process comprises an assembling step of the green tire, wherein several semi-finished products, previously and separately prepared from each other and corresponding to the different parts of the tire (carcass plies, belt strips, bead wires, fillings, sidewalls and treads) are associated with each other with a suitable assembling machine.

Afterwards, the green tire thus obtained is transferred to the subsequent shaping and cross-linking steps. To this end, a vulcanization mold is used, adapted to house the tire under working within a molding cavity having walls countershaped with respect to the outer surface of the tire once the cross-linking has been completed.

Shaping of the green tire may be carried out by feeding a pressurized fluid into the space defined by the tire inner surface, in order to press the outer surface of the green tire against the walls of the molding cavity. In one of the most widely used shaping methods, a vulcanization chamber made of elastomeric material, filled with vapor and/or other fluids, is inflated within the tire enclosed in the molding cavity. In this way, the green tire is pushed against the inner walls of the molding cavity, obtaining the desired shaping. Alternatively, shaping may be carried out without an inflatable vulcanization chamber, by preparing within the tire a toroidal metal support shaped in accordance to the configuration of the inner surface of the tire to be obtained (see for instance patent EP-242 840). The different coefficient of thermal expansion between the toroidal metal support and the green elastomeric material is exploited to achieve an adequate molding pressure.

At this point, the cross-linking step of the green elastomeric material present in the tire is carried out. To this aim, the outer wall of the vulcanization mold is caused to get in touch with a heating fluid (generally, vapor), so that the outer wall reaches a maximum temperature generally comprised between 100° C. and 230° C. At the same time, the inner surface of the tire is brought to the cross-linking temperature with the same pressurized fluid employed to press the tire against the walls of the molding cavity, heated up to a maximum temperature comprised between 100 and 250° C. The time necessary to obtain a satisfactory degree of cross-linking throughout the mass of the elastomeric material may generally range between 3 min and 90 min, and mainly depends on the tire size.

Some embodiments of the present invention are reported in the following.

EXAMPLES 1–3

Preparation of a Masterbatch Comprising the Hydrophilic Polymer

Compositions according to the present invention (masterbatch) were prepared as shown in Table 1. For comparison, compositions were also prepared which contained the hydrophilic polymer but not the functionalized polymer (Example 2) and compositions which contained the hydrophilic polymer combined with a polymer that had no reactive functional groups (Example 3).

A mixture of the ingredients reported in Table 1 (the amounts are expressed as % by weight of the total) was fed to a parallel twin-screw (co-rotating) extruder having a length/diameter ratio L/D=30. The maximum temperature reached during the extrusion was of 200° C.±5° C. The masterbatch was air cooled.

The compositions thus obtained were analyzed with an optical microscope in order to evaluate the dispersion of the hydrophilic polymer within the elastomeric matrix, according to the following method.

Preparation of Samples

A 3 g sample of each composition was pressure-molded in a Prestopress-Struers press (conditioning time: 15 min; pressure=1 atm; maximum temperature=110° C.).

From the discs thus obtained, sections having a thickness of 5 μm were obtained using a Reichert-Jung 2050 microtome equipped with a LN20 cryogenic unit (cutting temperature: −70° C.). The sections thus obtained were placed on a slide previously cooled at −70° C.

Optical Analysis

The sections thus prepared were observed with a transmission optical microscope with polarized light (Polyvar Met model; 10× lenses, multiplication factor=1, equipped with polarizer and analyzer). Twenty images for each sample were memorized through a JVC TK1280E videocamera with a Y/C connecting cable. The images were computer-analyzed (by means of an Image Pro Plus—Media Cybernetic software), measuring for the particles having a clear color, corresponding to domains containing the hydrophilic polymer, the mean area and mean diameter values, and the mean number of particles per surface unit of the sample. The results are reported in Table 1.

TABLE 1

| Example | 1 | 2 (*) | 3 (*) |
|---|---|---|---|
| SBR | 75 | 75 | 75 |
| PVA | 19 | 25 | 19 |
| PE-MA | 6 | — | — |
| PEB | — | — | 6 |

TABLE 1-continued

| Example | 1 | 2 (*) | 3 (*) |
|---|---|---|---|
| Microscope analysis | | | |
| Average area ($\mu m^2$) | 145.94 | 328.12 | 220.10 |
| No. of particles ($mm^{-2}$) | 1788.90 | 689.50 | 1121.23 |
| Average diameter ($\mu m$) | 11.98 | 14.12 | 12.71 |

(*) comparative
SBR: styrene/butadiene copolymer, obtained by emulsion polymerization, containing 40% by weight of styrene, mixed with 37.5 phr of oil (marketed by Enichem Elastomeri under the abbreviation SBR 1721);
PVA: vinylalcohol/vinylacetate copolymer, obtained by hydrolysis of polyvinylacetate, having a hydrolysis degree of 83 mol %, a viscosity (DIN 53 015) of 2.8 ± 0.3 mPa · $s^2$ (marketed by Clariant Italia under the trademark Mowiol ® 3-83);
PE-MA: polyethylene grafted with 0.5% by weight of maleic anhydride, having a Melt Flow Index (at 190° C. and 2.16 kg) of 4 (marketed by Elf Atochem under the trademark Orevac ® OE 330);
PEB: ethylene/butene copolymer, having a Melt Flow Index (at 190° C. and 2.16 kg) of 3 (marketed by Exxon under the trademark Escorene ® LL 1004).

EXAMPLES 4–6

Silica-Containing Rubber Compositions

Sulfur-vulcanizable silica-containing rubber compositions were prepared. The compositions are reported in Table 2A (in phr). With respect to the reference rubber composition containing 70 phr of silica (Example 4), the rubber compositions of Examples 5–6 contain 6.3 phr of PVA according to the invention (Example 5) or 6.3 phr of starch/PVA composite according to U.S. Pat. No. 5,672,639 (Example 6) instead of 10 phr of silica. The amounts expressed in phr of silica and of hydrophilic polymers are not equal, since, as known, to evaluate the reinforcing properties of a filler, reference must be made to the parts by volume and not to the parts by weight.

All the ingredients, except for sulfur and the accelerators were mixed in an internal mixer (model Pomini PL 1.6) for about 5 min ($1^{st}$ step). As soon as the temperature of 145±5° C. was reached, the rubber composition was discharged. Thereafter, sulfur and the accelerating agents were added by mixing in a laboratory cylinder open mixer ($2^{nd}$ step).

TABLE 2A

| Example | 4 (*) | 5 | 6 (*) |
|---|---|---|---|
| $1^{st}$ step | | | |
| SBR | 84 | 65.3 | 84 |
| BR | 39 | 39 | 39 |
| $SiO_2$ | 70 | 60 | 60 |
| Masterbatch (Ex. 1) | — | 25 | — |
| Starch/PVA | — | — | 6.3 |
| Silane | 5.6 | 5.6 | 5.6 |
| Stearic acid | 2 | 2 | 2 |
| ZnO | 2.5 | 2.5 | 2.5 |
| Aromatic oil | 5 | 5 | 5 |
| Antioxidant | 2 | 2 | 2 |
| Microcrystalline wax | 1 | 1 | 1 |

TABLE 2A-continued

| Example | 4 (*) | 5 | 6 (*) |
|---|---|---|---|
| $2^{nd}$ step | | | |
| Sulfur | 1.4 | 1.4 | 1.4 |
| DPG | 1.9 | 1.9 | 1.9 |
| CBS | 1.8 | 1.8 | 1.8 |

(*) comparative
SBR: styrene/butadiene copolymer, obtained by emulsion polymerization, containing 25% by weight of styrene, mixed with 37.5 phr of oil (marketed by Bayer under the abbreviation SBR 5025);
BR: cis-1,4-polybutadiene (product Europrene Neocis ® BR 40 - Enichem Elastomeri);
DPG: diphenyl guanidine (product Vulkacit ® D - Bayer);
CBS: N-cyclohexyl-2-benzothiazyl-sulfenamide (product Vulkacit ® CZ - Bayer);
$SiO_2$: precipitated silica (product Zeosil ® 1165 MP - Rhône-Poulenc)
Starch/PVA: composite of destructured starch and ethylene/vinylalcohol copolymer in a 1.5/1 weight ratio, having a softening point of 147° C. (ASTM D1228), the starch having an amylose/amylopectine weight ratio of about 1/3, a humidity content of about 5% by weight (product Mater Bi ® 1128R - Novamont);
Silane: bis(3-triethoxysilylpropyl)tetrasulfide (product X50S comprising 50% carbon black and 50% silane - Degussa) (the amounts reported in the table refer to silane only);
Antioxidant: phenyl-p-phenylene diamine.

The compositions thus prepared were submitted to MDR rheometric analysis utilizing a Monsanto MDR rheometer, carrying out the tests at 151° C. for 60 min with an oscillation frequency of 1.66 Hz (100 oscillations per minute) and an oscillation amplitude of ±0.50°. The mechanical properties (according to ISO standard 37) and the hardness in IRHD degrees at 23° C. and 100° C. (according to ISO standard 48) were measured on samples of the aforesaid compositions cross-linked at 151° C. for 30 minutes. The results are shown in Table 2B.

Table 2B also shows the dynamic elastic properties, measured with a dynamic Instron device in the traction-compression mode according to the following method. A test piece of the cross-linked material having a cylindrical form (length=25 mm; diameter=14 mm), compression-preloaded up to a 10% longitudinal deformation with respect to the initial length, and kept at the prefixed temperature (70° C. or 10° C.) for the whole duration of the test, was submitted to a dynamic sinusoidal strain having an amplitude of ±3.33% with respect to the length under pre-load, with a 100 Hz frequency. The dynamic elastic properties are expressed in terms of dynamic elastic modulus (E') and tandelta (loss factor) values. As is known, the tandelta value is calculated as a ratio between the viscous modulus (E") and the elastic modulus (E'), both of them being determined with the above dynamic measurements.

Lastly the DIN abrasion values were measured according to ISO standard 4649, also reported in Table 2B, expressed as relative volumetric loss with respect to the reference composition of Example 4 (assumed to be 100).

TABLE 2B

| Example | 4 (*) | 5 | 6 (*) |
|---|---|---|---|
| Rheometric properties | | | |
| Max torque (dN · m) | 23.1 | 22.2 | 21.8 |
| Min. torque (dN · m) | 3.0 | 2.3 | 2.7 |
| Delta torque (dN · m) | 20.1 | 19.9 | 19.1 |
| t90 (min) | 21.0 | 20.0 | 30.0 |

TABLE 2B-continued

| Example | 4 (*) | 5 | 6 (*) |
|---|---|---|---|
| Mechanical properties | | | |
| 100% Modulus (MPa) | 2.50 | 2.70 | 3.07 |
| 300% Modulus (MPa) | 9.59 | 9.55 | 10.05 |
| Stress at break (MPa) | 16.20 | 15.30 | 13.80 |
| Elongation at break (%) | 485 | 435 | 395 |
| 300% Mod./100% Mod. | 3.8 | 3.5 | 3.3 |
| Dynamic properties | | | |
| E' (70° C.) (MPa) | 6.20 | 6.39 | 6.25 |
| E' (10° C.) (MPa) | 8.42 | 9.46 | 8.51 |
| Tandelta (70° C.) | 0.112 | 0.095 | 0.093 |
| Tandelta (10° C.) | 0.270 | 0.254 | 0.238 |
| IRHD hardness at 23° C. | 74 | 73 | 74 |
| IRHD hardness at 100° C. | 69 | 68 | 69 |
| DIN abrasion | 100 | 105 | 125 |

(*) comparative

EXAMPLES 7–9

Rubber Compositions Containing Carbon Black

Sulfur-vulcanizable rubber compositions containing carbon black were prepared with the same method described for Examples 4–6. The compositions thus obtained are reported in Table 3A (in phr). With respect to the reference rubber composition containing 70 phr of carbon black (Ex. 7), the rubber compositions of Examples 8–9 contain 7 phr of PVA according to the invention (Ex. 8) or 7 phr of starch/PVA composite according to U.S. Pat. No. 5,672,639 (Ex. 9), instead of 10 phr of carbon black.

The same measurements of Examples 4–6 were carried out on the rubber compositions thus obtained. The results are shown in Table 3B.

TABLE 3A

| Example | 7 (*) | 8 | 9 (*) |
|---|---|---|---|
| 1st step | | | |
| SBR | 84 | 63 | 84 |
| BR | 39 | 39 | 39 |
| C.B. | 70 | 60 | 60 |
| Masterbatch (Ex. 1) | — | 28 | — |
| Starch/PVA | — | — | 7 |
| Silane | — | 0.7 | 0.7 |
| Stearic acid | 2 | 2 | 2 |
| ZnO | 2.5 | 2.5 | 2.5 |
| Aromatic oil | 5 | 5 | 5 |
| Antioxidant | 2 | 2 | 2 |
| Microcristalline wax | 1 | 1 | 1 |
| 2nd step | | | |
| Sulfur | 1.4 | 1.4 | 1.4 |
| DPG | 1.9 | 1.9 | 1.9 |
| CBS | 1.8 | 1.8 | 1.8 |

(*) comparative
SBR: styrene/butadiene copolymer, obtained by emulsion polymerization, containing 25% by weight of styrene, mixed with 37.5 phr of oil (marketed by Bayer under the abbreviation SBR 5025);
BR: cis-1,4-polybutadiene (product Europrene Neocis ® BR 40 - Enichem Elastomeri);
DPG: diphenyl guanidine (product Vulkacit ® D - Bayer);
CBS: N-cyclohexyl-2-benzothiazyl-sulfenamide (product Vulkacit ® CZ - Bayer);
C.B.: N234 carbon black (Cabot);

TABLE 3A-continued

| Example | 7 (*) | 8 | 9 (*) |
|---|---|---|---|

Starch/PVA: composite of destructured starch and ethylene/vinylalcohol copolymer in a 1.5/1 weight ratio, having a softening point of 147° C. (ASTM D1228), the starch having an amylose/amylopectine weight ratio of about 1/3, a humidity content of about 5% by weight (product Mater Bi ® 1128R - Novamont);
Silane: bis(3-triethoxysilylpropyl)tetrasulfide (product X50S comprising 50% carbon black and 50% silane - Degussa) (the amounts reported in the table refer to silane only);
Antioxidant: phenyl-p-phenylene diamine.

TABLE 3B

| Example | 7 (*) | 8 | 9 (*) |
|---|---|---|---|
| Rheometric properties | | | |
| Max torque (dN · m) | 21.2 | 18.7 | 17.8 |
| Min. torque (dN · m) | 4.4 | 3.4 | 3.6 |
| Delta torque (dN · m) | 16.6 | 15.3 | 14.2 |
| t90 (min) | 13.3 | 11.9 | 11.8 |
| Mechanical properties | | | |
| 100% Modulus (MPa) | 3.17 | 3.10 | 2.85 |
| 300% Modulus (MPa) | 13.30 | 12.10 | 11.00 |
| Stress at break (MPa) | 15.80 | 15.10 | 13.32 |
| Elongation at break (%) | 380 | 403 | 375 |
| 300% Mod./100% Mod. | 4.2 | 3.9 | 3.9 |
| Dynamic properties | | | |
| E' (70° C.) (MPa) | 7.51 | 6.78 | 6.31 |
| E' (10° C.) (MPa) | 12.83 | 11.72 | 11.10 |
| Tandelta (70° C.) | 0.191 | 0.173 | 0.170 |
| Tandelta (10° C.) | 0.337 | 0.316 | 0.320 |
| IRHD hardness at 23° C. | 75 | 74 | 72 |
| IRHD hardness at 100° C. | 70 | 67 | 66 |
| DIN abrasion | 100 | 115 | 130 |

(*) comparative

EXAMPLES 10–11

Rubber Compositions Containing Silica and Carbon Black

Sulfur-vulcanizable rubber compositions containing silica and carbon black were prepared with the same method described for Examples 4–6. The compositions are reported in Table 4A (in phr).

The same measurements of Examples 4–6 were carried out on the rubber compositions thus obtained.

Additionally, the water absorption capacity of the prepared rubber compositions was also evaluated with the following method.

A sample of rubber composition was vulcanized in a press heated to 151° C. for 30 min. Polytetrafluoroethylene sheets were interposed between the rubber composition and the press platens to prevent any contamination and adhesion of said rubber composition. Sheets measuring 120×120 mm and having a thickness of about 1.0 mm were obtained in this way. Rectangular samples measuring 60×30 mm were cut from these sheets. Said samples were oven-dried at 65° C. for 48 hours and then exposed to dry air in a dry-box at room temperature for 48 hours. The weight of the samples so dried was registered. The samples were then immersed in water at two different temperatures (4° C. and 23° C.) and their weight was measured after 28, 51 and 118 hours of immersion. Table 4C shows the results obtained, expressed as percent variation of the weight based on the starting weight.

TABLE 4A

| Example | 10 (*) | 11 |
|---|---|---|
| 1st step | | |
| SBR | 75 | 53 |
| BR | 25 | 25 |
| SiO₂ | 35 | 35 |
| C.B. | 35 | 25 |
| Masterbatch (Ex. 1) | — | 29 |
| Silane | 3.5 | 3.5 |
| Stearic acid | 2 | 2 |
| ZnO | 3 | 3 |
| Aromatic oil | 15 | 15 |
| Antioxidant | 2 | 2 |
| Microcristalline wax | 1 | 1 |
| 2nd step | | |
| Sulfur | 1.2 | 1.2 |
| CBS | 2.5 | 2.5 |

(*) comparative
SBR: styrene/butadiene copolymer, obtained by emulsion polymerization, containing 40% by weight of styrene, mixed with 37.5 phr of oil (marketed by Enichem Elastomeri under the abbreviation SBR 1721);
BR: cis-1,4-polybutadiene (product Europrene Neocis ® BR 40 - Enichem Elastomeri);
DPG: diphenyl guanidine (product Vulkacit ® D - Bayer);
CBS: N-cyclohexyl-2-benzothiazyl-sulfenamide (product Vulkacit ® CZ - Bayer);
SiO₂: precipitated silica (product Zeosil ® 1165 MP - Rhône-Poulenc);
C.B. : N234 carbon black (Cabot);
Starch/PVA: composite of destructured starch and ethylene/vinylalcohol copolymer in a 1.5/1 weight ratio, having a softening point of 147° C. (ASTM D1228), the starch having an amylose/amylopectine weight ratio of about 1/3, a humidity content of about 5% by weight (product Mater Bi ® 1128R - Novamont);
Silane: bis(3-triethoxysilylpropyl)tetrasulfide (product X50S comprising 50% carbon black and 50% silane - Degussa) (the amounts reported in the table refer to silane only);
Antioxidant: phenyl-p-phenylene diamine.

TABLE 4B

| Example | 10 (*) | 11 |
|---|---|---|
| Max torque (dN · m) | 16.5 | 16.4 |
| Min. torque (dN · m) | 3.1 | 2.6 |
| Delta torque (dN · m) | 13.4 | 13.8 |
| t90 (min) | 15.0 | 15.0 |
| 100% Modulus (MPa) | 2.5 | 2.6 |
| 300% Modulus (MPa) | 11.0 | 11.2 |
| Stress at break (MPa) | 17.3 | 16.4 |
| Elongation at break (%) | 474 | 456 |
| 300% Mod./100% Mod. | 4.4 | 4.3 |
| E' (70° C.) (MPa) | 6.1 | 6.0 |
| E' (10° C.) (MPa) | 14.9 | 15.5 |
| Tandelta (70° C.) | 0.230 | 0.200 |
| Tandelta (10° C.) | 0.609 | 0.569 |
| IRHD hardness at 23° C. | 75 | 74 |
| IRHD hardness at 100° C. | 63 | 62 |
| DIN abrasion | 100 | 102 |

(*) comparative

TABLE 4C

| Example | 10 (*) | 11 |
|---|---|---|
| Immersion in water at 23° C. | | |
| 28 hours | 1.1 | 1.7 |
| 51 hours | 1.7 | 2.3 |
| 118 hours | 2.3 | 3.2 |
| Immersion in water at 4° C. | | |
| 28 hours | 0.8 | 1.0 |
| 51 hours | 1.1 | 1.3 |
| 118 hours | 1.4 | 1.8 |

(*) comparative

From the experimental results reported above, the following may be noticed.

The presence of the functionalized polymer ensures an excellent dispersion of the hydrophilic polymer throughout the polymer matrix, as proved by optical analysis (Ex. 1–3, Tab. 1).

In the rubber compositions containing silica as a reinforcing filler, the partial replacement of silica with a combination of hydrophilic polymer and functionalized polymer according to the present invention allows to achieve, with respect to similar compositions wherein a destructured starch/PVA composite is employed, a more marked reinforcing effect, as evidenced by the high modulus values, in particular at high elongation, 300% modulus/100% modulus ratio and stress at break. The cross-linked product also shows improved hysteretic properties, in particular higher tandelta values at 10° C. with the same values of tandelta at 70° C. (i.e. a better road grip on wet grounds with the same rolling resistance). These effects have been achieved without significantly worsening abrasion resistance.

The reinforcing effect of the hydrophilic polymer according to the present invention remains in any event high also when the hydrophilic polymer partly replaces carbon black, which, as known, is a particularly effective reinforcing filler. This is proved by the mechanical properties (modulus, elongation and stress at break) and by the abrasion resistance, which maintains with values comparable to those of the compositions only containing carbon black. The same effect is obtained by employing the destructured starch/PVA composite (see Examples 7–9, Tables 3A–3B).

The same behavior is achieved with rubber compositions reinforced with mixtures of silica and carbon black (see Examples 10–11, Tables 4A–4B).

Without being bound in any way to any interpretative theory, the Applicant believes that the improved reinforcing capabilities of the hydrophilic polymer combined with the functionalized polymer according to the present invention with respect to the plasticized destructured starch are due to an improved interaction of the hydrophilic polymer with the elastomeric matrix and with the reinforcing filler, if present. Conversely, destructured starch tends to favor intramolecular interaction to the detriment of interactions with the elastomeric matrix and with the reinforcing filler, so that it turns out to be poorly compatibilized within the cross-linked material.

The invention claimed is:
1. A tire for vehicle wheels, comprising:
   at least one element comprising a cross-linked elastomeric material;
   wherein the cross-linked elastomeric material is formed by cross-linking a composition, comprising:
      at least one elastomeric diene polymer;
      at least one first thermoplastic polymer; and
      at least one second thermoplastic polymer;
   wherein the at least one first thermoplastic polymer comprises a main hydrocarbon chain, wherein hydrophilic groups are linked to the main hydrocarbon chain,
wherein the at least one second thermoplastic polymer comprises functional groups, and
wherein the functional groups are reactive with the hydrophilic groups.

2. The tire of claim 1, wherein the at least one element comprises a tread belt.

3. The tire of claim 1, wherein an amount of the at least one first thermoplastic polymer is greater than or equal to 0.1 phr and less than or equal to 100 phr.

4. The tire of claim 1, wherein a weight ratio of the at least one first thermoplastic polymer to the at least one second thermoplastic polymer is greater than or equal to 0.5:1 and less than or equal to 10:1.

5. The tire of claim 1, wherein the hydrophilic groups are selected from the group consisting of:
hydroxyl groups (—OH);
carboxylic groups (—COOH);
ester groups (—COOR);
amide groups (—CONH$_2$);
sulfonic groups (—SO$_3$H); and
combinations thereof;
wherein the carboxylic groups may be at least partially in salt form,
wherein R comprises alkyl or hydroxyalkyl, and
wherein the sulfonic groups may be at least partially in salt form.

6. The tire of claim 1, wherein the at least one first thermoplastic polymer is capable of absorbing at least 0.1% by weight of water, based on a weight of the at least one first thermoplastic polymer after a 24-hour exposure in an environment comprising a 50% relative humidity at a temperature of 24° C., measured according to ASTM standard D 570.

7. The tire of claim 1, wherein the at least one first thermoplastic polymer comprises a melting point less than 230° C.

8. The tire of claim 1, wherein the at least one first thermoplastic polymer is selected from the group consisting of:
polyacrylic acid;
polymethacrylic acid;
polyhydroxyalkylacrylate;
polyalkylacrylate;
polyacrylamide;
acrylamide/acrylic acid copolymers;
polyvinylalcohol;
polyvinylacetate;
vinylalcohol/vinylacetate copolymers;
ethylene/vinylacetate copolymers;
ethylene/vinylalcohol copolymers;
ethylene/vinylalcohol/vinylacetate terpolymers;
polyvinylsulfonic acid;
polystyrene sulfonate; and
mixtures thereof.

9. The tire of claim 1, wherein the at least one first thermoplastic polymer comprising hydroxy groups comprises repeating units comprising

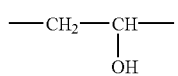

a formula (I) listed below
with a random or block distribution along the main hydrocarbon chain.

10. The tire of claim 1, wherein the at least one first thermoplastic polymer is selected from the group consisting of:
vinylalcohol polymers obtained by hydrolysis of polyvinylacetate, with a hydrolysis degree greater than or equal to 50 mol % and less than or equal to 100 mol %;
ethylene/vinylalcohol copolymers comprising a content of ethylene units greater than or equal to 20 mol % and less than or equal to 60 mol %; and
mixtures thereof.

11. The tire of claim 1, wherein the at least one second thermoplastic polymer comprises a thermoplastic hydrocarbon polymer comprising functional groups selected from the group consisting of:
carboxylic groups;
anhydride groups;
ester groups;
silane groups;
epoxy groups; and
combinations thereof.

12. The tire of claim 1, wherein the at least one second thermoplastic polymer comprises an amount of functional groups greater than or equal to 0.05 parts-by-weight and less than or equal to 50 parts-by-weight, based on 100 parts-by-weight of the at least one second thermoplastic polymer.

13. The tire of claim 1, wherein the composition further comprises at least one reinforcing filler.

14. The tire of claim 13, wherein the at least one reinforcing filler comprises carbon black.

15. The tire of claim 13, wherein the at least one reinforcing filler comprises silica.

16. The tire of claim 13, wherein the at least one reinforcing filler comprises carbon black and silica.

17. The tire of claim 15, wherein the composition further comprises a silica coupling agent.

18. The tire of claim 1, wherein the composition further comprises a sulfur-based vulcanizing agent.

19. A cross-linked elastomeric composition, comprising:
at least one elastomeric diene polymer;
at least one first thermoplastic polymer; and
at least one second thermoplastic polymer;
wherein the at least one first thermoplastic polymer comprises a main hydrocarbon chain,
wherein hydrophilic groups are linked to the main hydrocarbon chain,
wherein the at least one second thermoplastic polymer comprises functional groups, and
wherein the functional groups are reactive with the hydrophilic groups.

20. The composition of claim 19, wherein an amount of the at least one first thermoplastic polymer is greater than or equal to 0.1 phr and less than or equal to 100 phr.

21. The composition of claim 19, wherein a weight ratio of the at least one first thermoplastic polymer to the at least one second thermoplastic polymer is greater than or equal to 0.5:1 and less than or equal to 10:1.

22. The composition of claim 19, wherein the hydrophilic groups are selected from the group consisting of:
hydroxyl groups (—OH);
carboxylic groups (—COOH);
ester groups (—COOR);
amide groups (—CONH$_2$);
sulfonic groups (—SO$_3$H); and
combinations thereof;

wherein the carboxylic groups may be at least partially in salt form, wherein R comprises alkyl or hydroxyalkyl, and wherein the sulfonic groups may be at least partially in salt form.

23. The composition of claim 19, wherein the at least one first thermoplastic polymer is capable of absorbing at least 0.1% by weight of water, based on a weight of the at least one first thermoplastic polymer after a 24-hour exposure in an environment comprising a 50% relative humidity at a temperature of 24° C., measured according to ASTM standard D 570.

24. The composition of claim 19, wherein the at least one first thermoplastic polymer comprises a melting point less than 230° C.

25. The composition of claim 19, wherein the at least one first thermoplastic polymer is selected from the group consisting of:
   polyacrylic acid;
   polymethacrylic acid;
   polyhydroxyalkylacrylate;
   polyalkylacrylate;
   polyacrylamide;
   acrylamide/acrylic acid copolymers;
   polyvinylalcohol;
   polyvinylacetate;
   vinylalcohol/vinylacetate copolymers;
   ethylene/vinylacetate copolymers;
   ethylene/vinylalcohol copolymers;
   ethylene/vinylalcohol/vinylacetate terpolymers;
   polyvinylsulfonic acid;
   polystyrene sulfonate; and
   mixtures thereof.

26. The composition of claim 19, wherein the at least one first thermoplastic polymer comprising hydroxy groups comprises repeating units

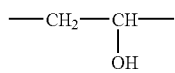

(I)

comprising a formula (I) listed below
   with a random or block distribution along the main hydrocarbon chain.

27. The composition of claim 19, wherein the at least one first thermoplastic polymer is selected from the group consisting of:
   vinylalcohol polymers obtained by hydrolysis of polyvinylacetate, with a hydrolysis degree greater than or equal to 50 mol % and less than or equal to 100 mol %;
   ethylene/vinylalcohol copolymers comprising a content of ethylene units greater than or equal to 20 mol % and less than or equal to 60 mol %; and
   mixtures thereof.

28. The composition of claim 19, wherein the at least one second thermoplastic polymer comprises a thermoplastic hydrocarbon polymer comprising functional groups selected from the group consisting of:
   carboxylic groups;
   anhydride groups;
   ester groups;
   silane groups;
   epoxy groups; and
   combinations thereof.

29. The composition of claim 19, wherein the at least one second thermoplastic polymer comprises an amount of functional groups greater than or equal to 0.05 parts-by-weight and less than or equal to 50 parts-by-weight, based on 100 parts-by-weight of the at least one second thermoplastic polymer.

30. The composition of claim 19, further comprising at least one reinforcing filler.

31. The composition of claim 30, wherein the at least one reinforcing filler comprises carbon black.

32. The composition of claim 30, wherein the at least one reinforcing filler comprises silica.

33. The composition of claim 30, wherein the at least one reinforcing filler comprises carbon black and silica.

34. The composition of claim 32, further comprising a silica coupling agent.

35. The composition of claim 19, further comprising a sulfur-based vulcanizing agent.

* * * * *